Patented July 26, 1938

2,124,630

UNITED STATES PATENT OFFICE 2,124,630

ARTIFICIAL RESINS

William M. Quattlebaum, Charleston, W. Va., assignor, by mesne assignments, to Union Carbide and Carbon Corporation, a corporation of New York No Drawing. Application January 16, 1936, Serial No. 59,328

11 Claims. (Cl. 260—2)

This invention is directed to artificial resins, and is particularly concerned with improved artificial resins and resinous masses made from certain vinyl compounds.

It has long been known that vinyl compounds, particularly the aliphatic vinyl compounds which contain a single olefinic double bond in their structure, such as the vinyl halides and the vinyl esters of aliphatic acids, can be polymerized to yield artificial masses of more or less value. Many special methods of treatment or manufacture have been proposed for improving the resinous materials obtained by the polymerization of these aliphatic vinyl compounds, and perhaps the most fruitful of such proposals was that of conjointly polymerizing two different types of vinyl compounds. These conjoint polymers, such, for example, as may be made by polymerizing vinyl chloride in admixture with vinyl acetate, differ profoundly from the polymers of the individual vinyl compounds, and represent a marked improvement in the art of vinyl resins.

It is generally conceded that vinyl resins suffer from certain disabilities which have retarded a more widespread acceptance of them and utilization of their many valuable properties in certain fields. Thus, the polymers of the vinyl esters of aliphatic acids (vinyl acetate, propionate, butyrate, etc.) are too soft, weak, and easily soluble, and soften at temperatures too low to make them suitable for many purposes. On the other hand the polymers of vinyl chloride or other vinyl halides are too brittle, unstable, and hard, and are insufficiently plastic to be entirely satisfactory. The conjoint polymers mentioned above possess improved properties entirely different from those of the other types of vinyl resins, but although they have met with great success, and have proved to be well suited for many uses, they are susceptible of improvement in certain ways.

For example, the best of the conjoint polymers soften at about 50° to 60° C. This is usually sufficiently elevated for practical purposes, but in some instances greater rigidity at high temperatures is desirable. The conjoint polymers are very strong and tough, but for some applications of the material it would be desirable to provide in them increased resistance to fatigue.

The principal object of this invention is to provide a simple, efficient and economical means for improving the properties of vinyl resins. It is also an object to provide an entirely new class of vinyl resins together with processes for making them.

Since it is usually true that strength, softening point, etc., vary directly with the molecular size of the resinous polymers, I have tried to raise the softening point and increase the fatigue resistance of vinyl resins by modifying conditions of polymerization to give products of greater molecular weight. This expedient gave positive results, but showed also that if the degree of molecular aggregation in the polymer is increased sufficiently to produce the desired high softening temperature in the resin, it may be accompanied by such changes in the other qualities of the resin as to offset completely the advantages gained. For example, it tends to cause the resin to be so difficultly soluble as to handicap seriously purifying and handling operations, and the resin tends to become so nearly infusible as to be exceedingly difficult to mold and work.

I have found that the disadvantages of the foregoing expedient can be largely avoided, and the objects of this invention attained by introducing into the polymerization process by which vinyl resins are made, a small quantity of certain classes of substances which apparently affect the course of the polymerization reaction and cause the formation of products of profoundly altered structure and properties. In general, I prefer to add a few per cent. (based on the total weight of vinyl compounds present) of a substance having in its structure at least two olefinic double bonds, and which is free from conjugated pairs of olefinic double bonds, and free from all cross conjugated double bonds. Substances of this class may contain oxygen in ether linkage or in carbon-to-oxygen double linkage. The olefinic double bonds of the substances mentioned may be conjugated with one, but only one, oxygen atom, provided the two systems of double bonds are isolated,—not conjugated with each other,— and provided none of the olefinic double bonds is in a cross conjugated system, i. e. conjugated with two oxygen atoms or other double bonds.

The quantity of the modifying substance is critical, and the amount necessary to produce the unusual results of this invention is quite small. The broadest useful range is represented by a concentration of modifier of up to about 10% by weight of the vinyl compound or vinyl compounds to be polymerized, and from 0.25% to about 5% is preferred. I prefer to employ between about 0.50% and about 2% of the modifying substance, and specifically, I have found that around 1% to 2% gives the best results.

In practicing this invention, the polymerization may be carried out in any known way applicable to the vinyl compound to be used, the only difference being that a small amount of the modifying substance is added to the usual reaction mixture. I prefer to conduct the polymerization of aliphatic vinyl compounds, or their mixtures, by the aid of polymerizing catalysts, such as dibenzoyl peroxide and acetyl benzoyl peroxide, at temperatures below about 60° C. and preferably around 40° C. or somewhat lower. Liquid media or diluents may be employed in the reaction, and higher polymers are obtained if the quantity thereof is as small as possible, and if the liquid is chosen from those which are nonsolvents or poor solvents for the resinous products to be formed. Examples of suitable liquid media are aliphatic hydrocarbons, aliphatic alcohols, and aliphatic ketones.

This invention results in the formation of resinous materials which presumably have structural and spatial configurations entirely different from polymers made in the absence of the doubly unsaturated modifying substances used. The new products in their macromolecular structure are undoubtedly more nearly uniformly extended in three dimensions than is the case with ordinary vinyl polymers which are fairly definitely assumed to have structures of the elongated unbranched chain type. The tendency of the new forms of polymers to increase in size in three dimensions may be explained as the formation of cross-linkages between the unbranched or straight chains of the usual vinyl polymers, or as being due to the formation of profusely branched-chain polymeric forms, or to both causes.

While these assumptions are, of course, hypothetical, and have not been proved because of the practical difficulties involved, certain corroborative experimental evidence of their probability exists. For example, the products of this invention have been found to possess average macromolecular weights not greatly larger than those of vinyl polymers formed under identical conditions but in the absence of doubly unsaturated modifying substances. This tends to establish the fact that entirely new configurations and polymeric structures are present in the polymers of this invention as opposed to those vinyl polymers heretofore known, since otherwise the novel properties of the new products would be such as result from increased macromolecular weight, or simple cross linking of the usual elongated straight-chain vinyl polymers. In any event, the invention is not to be limited by any theoretical or other explanation of its action or effect expressed herein.

As a practical matter, the new resins obtained by means of this invention are found to be exceptionally strong, tough, and stable to heat. They possess an elevated heat distortion point, and excel in the particularly important property of fatigue resistance. These new properties make the resins of this invention very valuable for uses which demand high fatigue strength, high softening point, and good heat stability. For example, the new resins are excellent denture-forming materials, and in this application all of their novel properties assume importance.

Unlike ordinary vinyl polymers in which the molecular weight is merely increased in the effort to obtain the desired properties, the resins of the present invention do not become insoluble in the usual resin solvents, and their molding temperatures are not inordinately high. These factors contribute greatly to the value of the new resins.

The following examples will serve to illustrate the invention:

*Example I*

Vinyl chloride and vinyl acetate were conjointly polymerized in the presence of 1.0% of allyl crotonate as the modifying substance. Polymerization was conducted by the action of heat and acetyl benzoyl peroxide as a catalyst. The details of the process are shown by the tabulated data.

| | |
|---|---|
| Vinyl chloride_____parts by weight__ | 7350 |
| Vinyl acetate_____do_____ | 2450 |
| Allyl crotonate_____do_____ | 98 |
| Per cent allyl crotonate (based on total weight of vinyl compounds)_____ | 1.0 |
| Acetone_____parts by weight__ | 4200 |
| Acetyl benzoyl peroxide_____do_____ | 29.4 |
| Per cent catalyst (based on total weight of vinyl compounds)_____ | 0.3 |
| Polymerization temperature_____° C__ | 30 |
| Hours of operation_____ | 72 |
| Per cent yield of polymer_____ | 35.0 |
| Per cent vinyl chloride in polymer_____ | 87.0 |

The resin resulting from the foregoing operation was strong, tough, light in color, and possessed excellent heat stability and fatigue resistance, and its softening point was higher than that of similar resins in which no modifying substance was incorporated.

Allyl crotonate

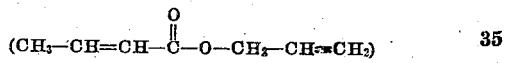

the modifier used in the above process, is of the class of substances which contain oxygen, and in which one of the two isolated olefinic double bonds is conjugated with oxygen.

*Example II*

In the process of this example, a vinyl resin was made by the conjoint polymerization of vinyl chloride with vinyl acetate in the presence of ethylene glycol dicrotonate as the modifying substance. The data are as follows:

| | |
|---|---|
| Vinyl chloride_____parts by weight__ | 437 |
| Vinyl acetate_____do____ | 138 |
| Ethylene glycol dicrotonate_____do____ | 8.62 |
| Per cent ethylene glycol dicrotonate (based on total weight of vinyl compounds)_____ | 1.5 |
| Actone_____parts by weight__ | 256 |
| Acetyl benzoyl peroxide_____do____ | 1.73 |
| Per cent catalyst (based on total weight of vinyl compounds)_____ | 0.3 |
| Polymerization temperature_____° C__ | 35 |
| Hours of operation_____ | 49 |
| Per cent yield of polymer_____ | 40.4 |
| Per cent vinyl chloride in polymer_____ | 84.5 |

This process resulted in a generally improved vinyl resin having highly desirable properties.

The modifying substance used in making this resin, ethylene glycol dicrotonate

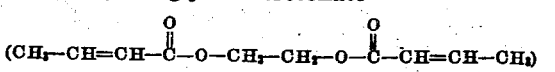

is a member of the group of substances in which each of two olefinic double bonds is conjugated with oxygen, but in which the two conjugated systems are isolated from each other.

*Example III*

Vinyl chloride and vinyl acetate were conjointly polymerized in the presence of 1.0% of divinyl ether by the action of heat and acetyl benzoyl peroxide as the catalyst. The details are shown by the tabulated data:

| | |
|---|---:|
| Vinyl chloride _____ parts by weight__ | 2625 |
| Vinyl acetate _____ do____ | 875 |
| Divinyl ether _____ do____ | 35 |
| Per cent divinyl ether (based on total weight of vinyl compounds) _____ | 1.0 |
| Actone _____ parts by weight__ | 1500 |
| Per cent catalyst (based on total weight of vinyl compounds) _____ | 0.3 |
| Polymerization temperature _____° C__ | 30 |
| Acetyl benzoyl peroxide___parts by weight__ | 10.5 |

The resin produced was strong, tough, light in color and possessed excellent heat stability, impact strength, fatigue resistance and a high softening point.

*Example IV*

Vinyl chloride and vinyl acetate were polymerized in the presence of 5% of divinyl acetal as the modifying substance. The details of the process are given below:

| | |
|---|---:|
| Vinyl chloride _____ parts by weight__ | 3178 |
| Vinyl acetate _____ do____ | 1050 |
| Divinyl acetal _____ do____ | 210 |
| Per cent divinyl acetal (based on total weight of vinyl compounds) _____ | 5.0 |
| Acetone _____ parts by weight__ | 1800 |
| Acetyl benzoyl peroxide _____do____ | 12.6 |
| Per cent catalyst (based on total weight of vinyl compounds) _____ | 0.3 |
| Polymerization temperature _____° C__ | 30.0 |
| Hours of operation _____ | 72 |
| Per cent vinyl chloride in polymer _____ | 82.3 |

The resin obtained in this process possessed a high heat distortion point, impact strength, fatigue resistance and tensile strength.

The wholly new vinyl resins made in accordance with this invention are characterized by possessing generally improved physical properties. The improvements accomplished by the invention will be readily apparent from the following table in which the physical properties of two types of vinyl resins are set forth:

| | Resin A | Resin B |
|---|---:|---:|
| Tensile strength, (lbs./sq. in.) | 9,700 | 9,000 |
| Impact strength, (ft. lbs.) | 0.44 | 0.26 |
| Modulus of elasticity, (lbs./sq. in.) | 412,000 | 400,000 |
| Modulus of rupture, (lbs./sq. in.) | 12,300 | 12,000 |
| Heat distortion point, (° C.) | 63.4 | 58 |
| Fatigue strength, (lbs./sq. in. at 1,000,000 cycles). | 3,400 | 2,400 |

Resin A was a resin resulting from conjointly polymerizing vinyl chloride with vinyl acetate in the presence of 1.0% of ethylene glycol dicrotonate, and represents the new resins of this invention.

Resin B was made in exactly the same way from the same materials in the same proportions as was resin A, but no modifying substances were included in its manufacture. This resin B represents the prior art materials.

It will be noted that certain physical properties are but slightly affected by the practice of this invention, however, other properties, such as tensile and impact strength, heat distortion point and fatigue resistance, are very markedly increased.

In the table, fatigue resistance is reported for one million cycles only, since at about that point the prior art resin, resin B, failed at 2,400 pounds per square inch fiber stress. However, resin A, made according to this invention, has successfully withstood not only one million cycles at 3,400 pounds per square inch fiber stress, but did not fail at ten million cycles at the same loading. This greatly augmented fatigue resistance is a very valuable feature of the new resin.

Allyl crotonate and ethylene glycol dicrotonate have been mentioned as suitable modifying substances. Other compounds having at least two olefinic double bonds and which are free from conjugated pairs of olefinic double bonds and free from cross conjugated double bonds may be used. Examples of substances of this class include divinyl ether, diallyl ether, crotyl crotonate, crotyl acrylate, divinyl acetal (ethylidene divinyl ether), and other ethers and esters of unsaturated alcohols and acids which possess the requisite structure. It is preferred to use modifying substances of relatively low boiling point, say, not above about 100° C., since the unreacted residue of such compounds can be more easily eliminated from the products obtained. Acids and acidic substances have a deleterious effect upon vinyl resins in general. For this reason it is desirable to avoid substances which are capable of hydrolyzing or otherwise decomposing to yield acids in the resin, and, therefore, those modifying substances other than esters are preferable for use in the practice of this invention.

Such substances as diallyl maleate are excluded from the practice of this invention since the olefinic double bond in the maleic acid radical is cross conjugated with two oxygen atoms. Materials such as divinyl benzene are wholly inoperative in this invention and cannot be used. This material and others of its general class are excluded since each of the olefinic double bonds is conjugated with double bonds in the benzene nucleus.

Modifications of the invention are possible, and it is intended to include such modifications within the invention as defined by the appended claims.

This application contains subject matter in common with my copending application Serial No. 5,855 filed Feb. 9, 1935.

I claim:

1. Process for making strong and tough artificial resins which comprises conjointly polymerizing a vinyl halide and a vinyl ester of an aliphatic acid in the presence of small quantities of an oxygen-containing substance having in its structure at least two olefinic double bonds and which is free from conjugated pairs of olefinic double bonds and free from cross conjugated double bonds, said substance having from four to ten carbon atoms in its molecule and the olefinic double bonds thereof being separated by not more than six carbon atoms.

2. A process for making strong and tough artificial resins which comprises conjointly polymerizing a vinyl halide and a vinyl ester of an aliphatic acid in the presence of small quantities of an oxygen-containing substance having in its structure at least two olefinic double bonds and which is free from conjugated pairs of olefinic double bonds and free from cross conjugated double bonds, at least one of the olefinic double bonds in said substance being conjugated with a single oxygen atom, said substance having from four to ten carbon atoms in its molecule and the olefinic double bonds thereof being separated by not more than six carbon atoms.

3. Process for making strong and tough artificial resins which comprises conjointly polymerizing a vinyl halide and a vinyl ester of an aliphatic acid in the presence of up to about 10% by weight of an oxygen-containing substance having in its structure at least two olefinic double bonds and which is free from conjugated pairs of olefinic double bonds and free from cross conjugated double bonds, said substance having from four to ten carbon atoms in its molecule and the olefinic double bonds thereof being separated by not more than six carbon atoms.

4. Process for making strong and tough artificial resins which comprises conjointly polymerizing vinyl chloride and vinyl acetate in the presence of up to about 10% by weight of an oxygen-containing substance having in its structure at least two olefinic double bonds and which is free from conjugated pairs of olefinic double bonds and free from cross conjugated double bonds, said substance having from four to ten carbon atoms in its molecule and the olefinic double bonds thereof being separated by not more than six carbon atoms.

5. Process for making strong and tough artificial resins which comprises conjointly polymerizing vinyl chloride and vinyl acetate by the aid of a catalyst at a temperature below about 60° C. in the presence of from about 0.50% to about 2% of an oxygen-containing substance boiling below about 100° C. and having in its structure at least two olefinic double bonds and which is free from conjugated pairs of olefinic double bonds and free from cross conjugated double bonds, the olefinic double bonds in said substance being separated by not more than six carbon atoms.

6. Process for making strong and tough artificial resins which comprises conjointly polymerizing vinyl chloride with a vinyl ester of a lower aliphatic acid in the presence of from about 0.25% to about 10% of a substance of the group consisting of allyl crotonate, ethylene glycol dicrotonate, divinyl ether, divinyl acetal, diallyl ether, crotoyl crotonate and crotyl acrylate.

7. A strong and tough artificial resin containing a substantial proportion of those substances which are formed by the conjoint polymerization of a vinyl halide with a vinyl ester of an aliphatic acid in the presence of small quantities of an oxygen-containing substance having in its structure at least two olefinic double bonds and which is free from conjugated pairs of olefinic double bonds and free from cross conjugated double bonds, said substance having from four to ten carbon atoms in its molecule and the olefinic double bonds thereof being separated by not more than six carbon atoms.

8. A strong and tough artificial resin containing a substantial proportion of those substances which are formed by the conjoint polymerization of a vinyl halide with a vinyl ester of an aliphatic acid in the presence of up to about 10% by weight of an oxygen-containing substance having in its structure at least two olefinic double bonds and which is free from conjugated pairs of olefinic double bonds and free from cross conjugated double bonds, said substance having from four to ten carbon atoms in its molecule and the olefinic double bonds thereof being separated by not more than six carbon atoms.

9. A strong and tough artificial resin containing a substantial proportion of those substances which are formed by the conjoint polymerization of vinyl chloride with vinyl acetate in the presence of up to about 10% by weight of an oxygen-containing substance having in its structure at least two olefinic double bonds and which is free from conjugated pairs of olefinic double bonds and free from cross conjugated double bonds, said substance having from four to ten carbon atoms in its molecule and the olefinic double bonds thereof being separated by not more than six carbon atoms.

10. A strong and tough artificial resin identical with a resin resulting from the conjoint polymerization of vinyl chloride with vinyl acetate in the presence of from about 0.50% to about 2% of an oxygen-containing substance boiling below about 100° C. and having in its structure at least two olefinic double bonds and which is free from conjugated pairs of olefinic double bonds and free from cross conjugated double bonds, the olefinic double bonds in said substance being separated by not more than six carbon atoms.

11. A strong and tough artificial resin substantially identical with a resin resulting from the conjoint polymerization of vinyl chloride with a vinyl ester of a lower aliphatic acid in the presence of from about 0.25% to about 10% of a substance of the group consisting of allyl crotonate, ethylene glycol dicrotonate, divinyl ether, divinyl acetal, diallyl ether, crotyl crotonate and crotyl acrylate.

WILLIAM M. QUATTLEBAUM.